United States Patent
Click et al.

(10) Patent No.: US 7,222,337 B2
(45) Date of Patent: May 22, 2007

(54) SYSTEM AND METHOD FOR RANGE CHECK ELIMINATION VIA ITERATION SPLITTING IN A DYNAMIC COMPILER

(75) Inventors: Clifford N. Click, San Jose, CA (US); Christopher A. Vick, San Jose, CA (US); Michael H. Paleczny, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 535 days.

(21) Appl. No.: 09/872,458

(22) Filed: May 31, 2001

(65) Prior Publication Data

US 2004/0015917 A1 Jan. 22, 2004

(51) Int. Cl.
*G06G 9/45* (2006.01)

(52) U.S. Cl. ............ 717/160; 717/150; 717/153; 717/154; 717/159

(58) Field of Classification Search ......... 717/124–161
See application file for complete search history.

(56) References Cited

U.S. PATENT DOCUMENTS

| | | | | |
|---|---|---|---|---|
| 5,121,498 | A | * | 6/1992 | Gilbert et al. .............. 717/149 |
| 5,247,693 | A | * | 9/1993 | Bristol ...................... 717/139 |
| 5,457,799 | A | | 10/1995 | Srvastava |
| 5,493,675 | A | * | 2/1996 | Faimman, Jr. et al. ...... 717/156 |
| 5,668,999 | A | * | 9/1997 | Gosling ..................... 717/126 |
| 5,797,013 | A | * | 8/1998 | Mahadevan et al. ........ 717/160 |
| 5,835,776 | A | | 11/1998 | Tirumalai et al. |
| 6,075,942 | A | * | 6/2000 | Cartwright et al. ......... 717/138 |
| 6,076,158 | A | * | 6/2000 | Sites et al. ................. 712/230 |
| 6,170,083 | B1 | | 1/2001 | Adl-Tabatabai |
| 6,192,515 | B1 | | 2/2001 | Doshi et al. |
| 6,343,375 | B1 | | 1/2002 | Gupta et al. |
| 6,519,765 | B1 | * | 2/2003 | Kawahito et al. .......... 717/127 |
| 6,539,541 | B1 | | 3/2003 | Geva |

OTHER PUBLICATIONS

Makoto Sato et al. Program Partioning Optimizations in an HPF Prototype Compiler,(c) 1996.*
Interative Type Analysis and Extended Message Splitting: Optimizing ☐☐Dynamically-Typed Object-Oriented Programs; Craig Chambers and David Ungar (c) 1990.*
"Optimizing Array Bound Checks Using Flow Analysis"; Rajiv Gupta, ☐☐University Of Pittsburgh; ACM Letters on Programming Languages and Systems, ☐☐vol. 2, Nos. 1-4, Mar. Dec. 1993, pp. 135-150.*
Related U.S. Appl. No. 09/872,456.

* cited by examiner

*Primary Examiner*—Chuck Kendall
(74) *Attorney, Agent, or Firm*—Martine Penilla & Gencarella, LLP

(57) ABSTRACT

A range check elimination loop structure is provided. The range check elimination loop structure includes a pre-loop structure based on an original loop structure, where the pre-loop structure is capable of testing indexing expressions for underflow. In addition, a main loop structure having indexing expressions based on the original loop structure is included. The indexing expressions included in the main loop preferably cannot produce an underflow or an overflow. Also included in the range check elimination loop structure is a post-loop structure based on the original loop structure that is capable of testing indexing expressions for overflow.

18 Claims, 14 Drawing Sheets

SYSTEM AND METHOD FOR RANGE CHECK ELIMINATION VIA ITERATION SPLITTING IN A DYNAMIC COMPILER

CROSS REFERENCE TO RELATED APPLICATIONS

This application is related to U.S. patent application Ser. No. 09/872,456, filed May 31, 2001, and entitled "System and Method for Loop Unrolling in a Dynamic Compiler," which is incorporated herein by reference.

BACKGROUND OF THE INVENTION

1. Field of the Invention

This invention relates generally to computer program compiling, and more specifically to range check elimination optimization in a dynamic compiling environment.

2. Description of the Related Art

Currently, many computer programs exist as compiled object code, which is designed to operate only on one particular operating system. In an effort to increase the efficiency associated with the execution of such computer programs, optimized compiling has been implemented. Optimizing a computer program generally attempts to eliminate portions of the computer code, which are essentially unused. In addition, optimizing may include performing program transformations to allow overall computations to be performed more efficiently, thereby consuming fewer computer resources. One such program transformation is range check elimination.

By way of background, many Java applications utilize arrays, which are an arrangement of information in one or more dimensions, e.g., a list, a table, or a multidimensional arrangement of data. Whenever an array is realized in memory using Java the size of the array is stored in memory along with any data referenced by the array. Generally, the Java array size is stored before the first element in the array.

For example, a one hundred element array in Java will have the number one hundred stored before the first element of the array. Thus, in order to keep the required number of elements free for data storage, arrays in Java are typically larger than would otherwise need to be in order to store a particular number of elements.

As instructions are interpreted by a Java Virtual Machine (JVM), one the operations that must be performed by the interpreter is an array boundary check. Specifically, whenever a Java array is accessed by a Java application, an array boundary check must be performed to ensure that before the array is accessed the element attempting to be accessed is not outside the boundary of the array. When an array access command attempts to access an element outside the boundary of the array an exception is triggered. Generally, the raised exceptions are configured to prevent memory access when they are raised.

Array boundary checking results in a more robust system since array access commands have access only to those data elements defined by the array, and no access to adjacent data is possible, resulting in fewer bugs and improved system security. However, the step-by-step comparison and verification required for array boundary checking, which typically requires several CPU cycles per check, consume valuable processing time.

Since JVMs have conventionally been implemented in software, boundary checking in Java is typically a process that adds extra machine cycles every time an array is accessed. The extra machine cycles utilized for array boundary checking greatly reduce the operating efficiency of the system, which only serves to further exacerbate an already slow, software-based, interpretive process.

Range check elimination attempts to optimize loop structures by removing array boundary checks from the main loop structure. To do this, conventional compilers attempt to prove a property over the entire loop structure that proves the array boundary check will pass before the loop structure is even entered. Thus, conventional compilers typically generate a test before the loop, then, after the test is passed, the main loop body can be entered.

For example if a loop structure is a "For" loop structure that indexes an array, conventional compilers will compare the loop limit variable to the array length prior to entering the loop structure. If the loop limit variable is larger than the array length, the program will take some other path. Otherwise, the compiler knows the array indexing variable will not be larger than the array length, and thus, the loop can be executed without further array boundary checks.

Thus, conventional compilers discover all the array access operations within a loop structure and attempt to relate the array indexes from those instructions to the length of the loop. The compilers then attempt to create a test prior to entering the loop that ensures all the array access operations in the loop will not violate the array boundary limits.

Unfortunately, when loops include array access operations that only occur when a particular condition is TRUE, conventional compilers generally cannot determine accurately whether the array boundaries will be violated. For example, an array can be accessed using the loop variable plus an offset if a particular condition is true. In this example, the array boundary check would only cause an exception if the loop variable is sufficiently high and the particular condition is TRUE.

Thus, during the above conditions, conventional compilers cannot relate the faulting array access to the condition being FALSE. Under these circumstances conventional compilers operate conservatively and leave the array boundary check within the loop structure.

In view of the foregoing, there is a need for systems and methods that speed up loop intensive programs in a dynamic compiling environment. The methods should provide efficient range check elimination in a dynamic compiling environment, such as in a Java virtual machine. To this end, the systems and methods should be capable of performing range check elimination acceptably fast to allow optimization to occur in a dynamic environment without unacceptable slowing of the compiling process.

SUMMARY OF THE INVENTION

Broadly speaking, the present invention fills these needs by performing range check elimination loop optimization during program execution. In one embodiment, a method for loop optimization within a dynamic compiler system is disclosed. A pre-loop structure is created based on an original loop structure, wherein the pre-loop structure is capable of testing indexing expressions for underflow. In addition, a main loop structure is generated having indexing expressions based on the original loop structure, wherein the indexing expressions cannot produce an underflow or an overflow. Further, a post-loop structure is created based on the original loop structure, wherein the post-loop structure is capable of testing indexing expressions for overflow. Optionally, the pre-loop structure and the post-loop structures can include an array boundary test. Preferably, the main loop structure does not include an array boundary test.

Also, the method can include compiling a computer program during execution of the computer program, and interpreting lines of the computer program during execution of the computer program.

In another embodiment, a further method for loop optimization within a dynamic compiler system is disclosed. A computer program having an original loop structure is executed, and the original loop structure is compiled during the execution of the computer program. In addition, a range check elimination loop structure is created based on the original loop structure during the compiling operation. The range check elimination loop structure includes a pre-loop structure, a main loop structure, and a post-loop structure. Optionally, the pre-loop structure is capable of testing indexing expressions for underflow, and the post-loop structure is capable of testing indexing expressions for overflow. Also optionally, indexing expressions included in the main loop structure can be set so as not to produce an underflow or an overflow.

A range check elimination loop structure is disclosed in a further embodiment of the present invention. The range check elimination loop structure includes a pre-loop structure based on an original loop structure, where the pre-loop structure is capable of testing indexing expressions for underflow. In addition, a main loop structure having indexing expressions based on the original loop structure is included. The indexing expressions included in the main loop preferably cannot produce an underflow or an overflow. Also included in the range check elimination loop structure is a post-loop structure based on the original loop structure that is capable of testing indexing expressions for overflow. As above, the pre-loop structure and the post-loop structures can include an array boundary test, and the main loop structure can be designed so as not to include an array boundary test. Further, the pre-loop structure, the main loop structure, and the post-loop structure, are generated using a dynamic compiler, which creates the loop structures during execution of a computer program containing source code for the range check elimination loop structure.

Advantageously, the RCE loop structure of the embodiments of the present invention allows range check elimination optimization for complex loop structures in a dynamic compiling environment. Further, the embodiments of the present invention allow range check elimination in loop structures having conditional array access operations that may cause exceptions at the boundary of the array.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for a performing range check elimination optimization during program execution. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
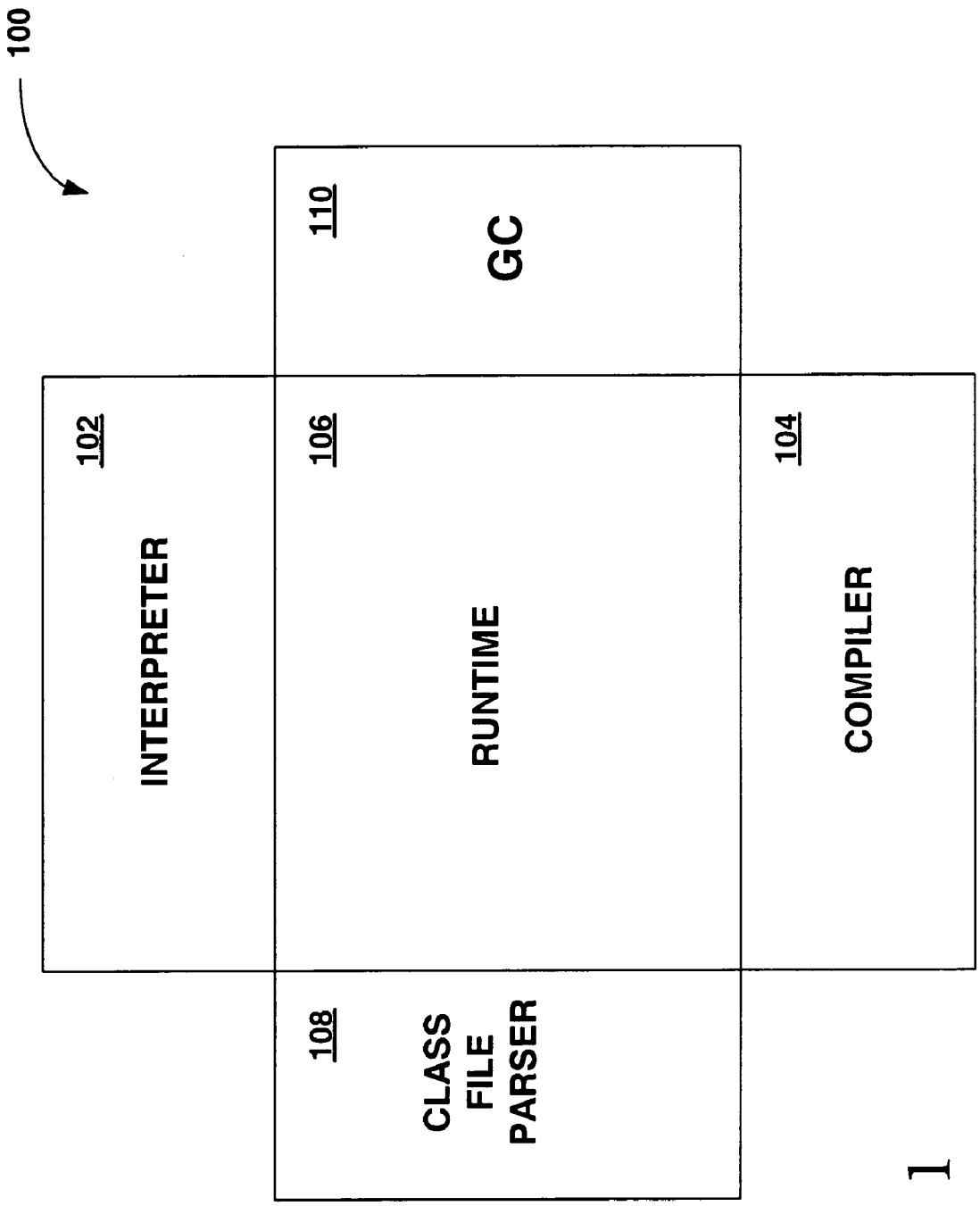
FIG. 1 is a block diagram showing a Java virtual machine, in accordance with an embodiment of the present invention.

FIG. 1 is a block diagram showing a Java virtual machine 100, in accordance with an embodiment of the present invention. The Java virtual machine 100 includes a runtime kernel 106 couple to an interpreter 102, a class file parser 108, a GC system 110, and a compiler 104. The Java virtual machine 100 is used to execute Java program source files on native operating systems and hardware.

A Java program includes a plurality of byte-codes, which are Java virtual machine instructions. The class file parser 108 of the Java virtual machine 100 is used to parse the byte-codes and provide them to the interpreter 102, which then interprets the byte-code. In addition, the interpreter 102 keeps track of the number of times a particular byte-code has been interpreted. When this number reaches a predetermined value, the Java virtual machine 100 compiles the byte-code using the compiler 104 into machine instructions. Thus, byte-codes that are used often are compiled into native machine instructions using the compiler 104 instead of being interpreted one byte-code at a time using the interpreter 102. In this manner, the Java virtual machine 100 of the embodiments of the present invention provides a hybrid of interpreted operation and smart compiling operation.

Figure 2:
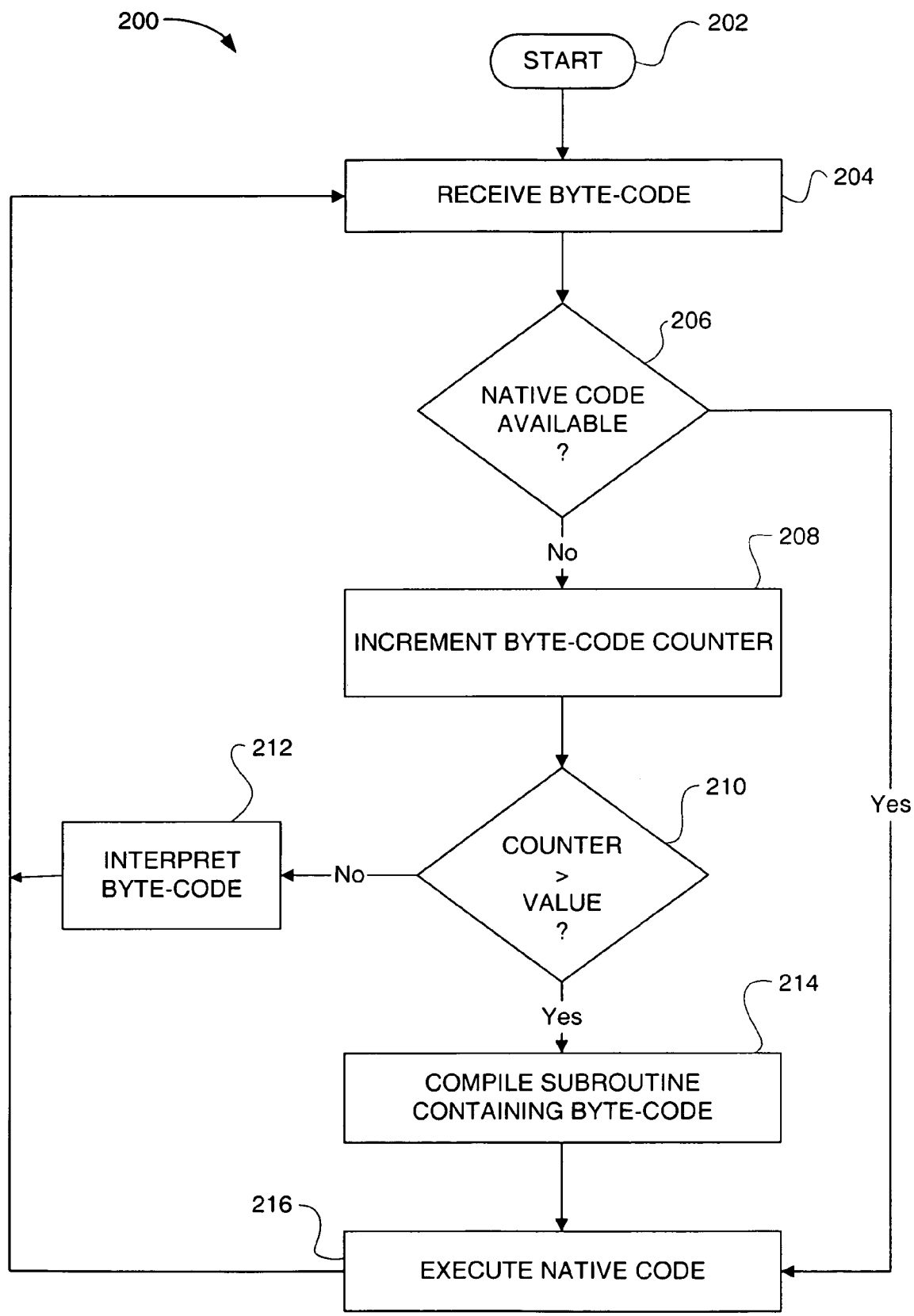
FIG. 2 is a flowchart showing a method for processing a byte-code using a Java virtual machine, in accordance with an embodiment of the present invention.

FIG. 2 is a flowchart showing a method 200 for processing a byte-code using a Java virtual machine, in accordance with an embodiment of the present invention. In an initial operation 202 pre-process operations are performed. Pre-process operations include loading the byte-code, and other preprocess operations that will be apparent to those skilled in the art.

In a receiving operation 204, the interpreter receives the byte-code from the class file parser. The class file parser parses the byte-codes of the Java program and provides them to the interpreter. The interpreter is then used to analyze the byte-code. A decision is then made as to whether native code is available for the received byte-code, in operation 206. As described in greater detail subsequently, often-used byte-codes of the Java program are compiled into native code. This native code then can be executed instead of interpreting the byte-code to increase speed and efficiency. If native code is available for the byte-code, the method 200 continues with a native code execution operation 216. Otherwise, the method 200 continues with operation 208.

In operation 208, a byte-code counter for the received byte-code is incremented. The byte-code counter is a counter that keeps track of the number of times the related byte-code has been interpreted in the current execution of the Java program. It should be noted that not every byte-code needs to be counted. In some embodiments, backward branching byte-codes are counted. Backward branching byte-codes are instructions that force the instruction pointer to go backwards in the program code, such as in a loop. In addition, subroutine calls can be counted. Typically, a subroutine call is counted each time the subroutine is entered.

A decision is then made as to whether the byte-code counter is greater than a predetermined value, in operation 210. Exemplary predetermined values can be ten thousand for a server compiler, and one thousand for a client compiler, however, it should be noted that any value can be used depending on the particular design requirements. If the byte-code counter is greater than a predetermined value, the method 200 continues with operation 214. Otherwise, the method 200 continues with operation 212.

In operation 212, the byte-code is executed using the interpreter. The interpreter is a high-level programming language translator that translates and runs the Java program at the same time. The interpreter translates one byte-code into the native machine language, executes it, and then proceeds to the next byte-code. The method then continues with another receive byte-code operation 204.

In operation 214, the subroutine that includes the received byte-code is compiled. The compiler translates the byte-codes of the subroutine into the native machine language. In one embodiment of the present invention, the compiler directly generates machine language. The compiled native code can then stored in a code cache for later use. In this manner, whenever the compiled subroutine is encountered, the native machine language from the code cache can be executed instead of re-interpreting the byte-code, which increases speed and efficiency.

The compiled native code is executed in operation 216. In this operation, the compiled byte-codes of the subroutine are executed using the native machine language of the platform executing the Java program. When executing the native code from the code cache, a call may be made to other native code or to non-compiled byte-codes. When non-compiled byte-codes are encountered, the method continues with another receive byte-code operation 204. In this manner, the embodiments of the present invention both interpret and compile byte-codes of the Java computer program. Specifically, using the embodiments of the present invention, the benefits of interpreted code are coupled with the benefits of a compiler that intelligently compiles byte-codes using optimization operations that increase the efficiency of the compiled native code.

Figure 3:
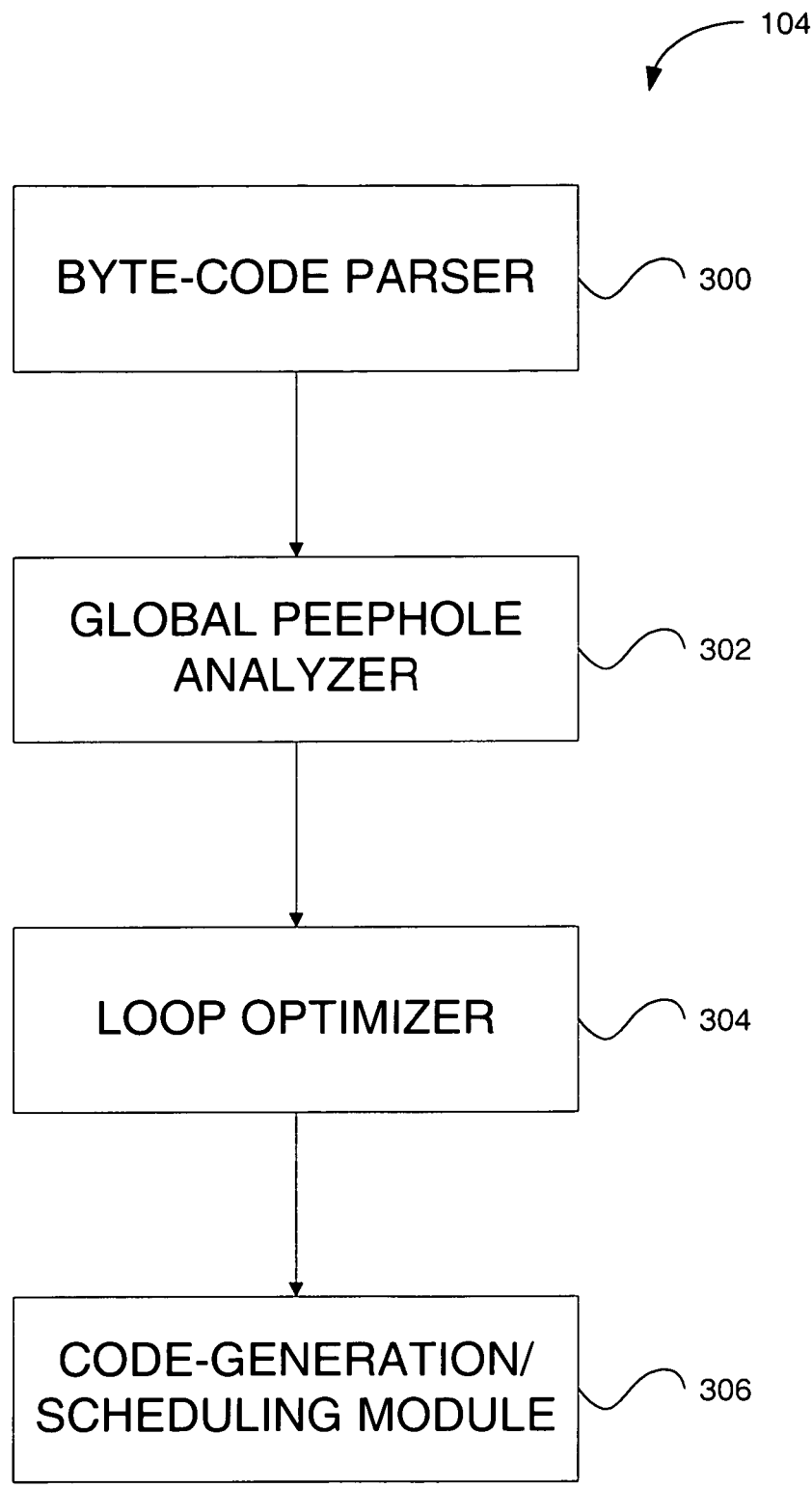
FIG. 3 is a block diagram showing a dynamic compiler, in accordance with an embodiment of the present invention.

FIG. 3 is a block diagram showing a compiler 104, in accordance with an embodiment of the present invention. The compiler includes a byte-code parser 300, a global peephole analyzer 302, a loop optimizer 304, and a code-generation and scheduling module 306. The compiler 104 uses these modules to perform code optimization to increase the efficiency of the compiled native code.

The byte-code parser 300 transforms the byte-codes of the Java program into an internal compiler representation used by the compiler 104. The internal compiler representation is an intermediate representation (IR), and includes inlining. The global peephole analyzer 302 uses the IR generated by the byte-code parser 300 to perform preliminary code optimization. For example, the global peephole analyzer 302 can combine repeated identical memory load operations into one load operation that uses a single register. Other operations that can be performed by the global peephole analyzer 302 include dead code elimination, constant folding, and constant propagation optimizations.

The loop optimizer 304 optimizes loop operations by restructuring the optimized code loops. The optimizer 304 builds loop tree structures for use in loop optimization, performs basic loop clean up and block scheduling, and performs loop transforms as described in greater detail subsequently. The code generation and scheduling module 306 performs code generation. Code generation includes transforming the IR code into native code, scheduling operations, and register allocations. Advantageously, scheduling freedom is improved using the embodiments of the present invention because loop optimizations increase the size of loop bodies allowing addition freedom in scheduling operations.

Figure 4:
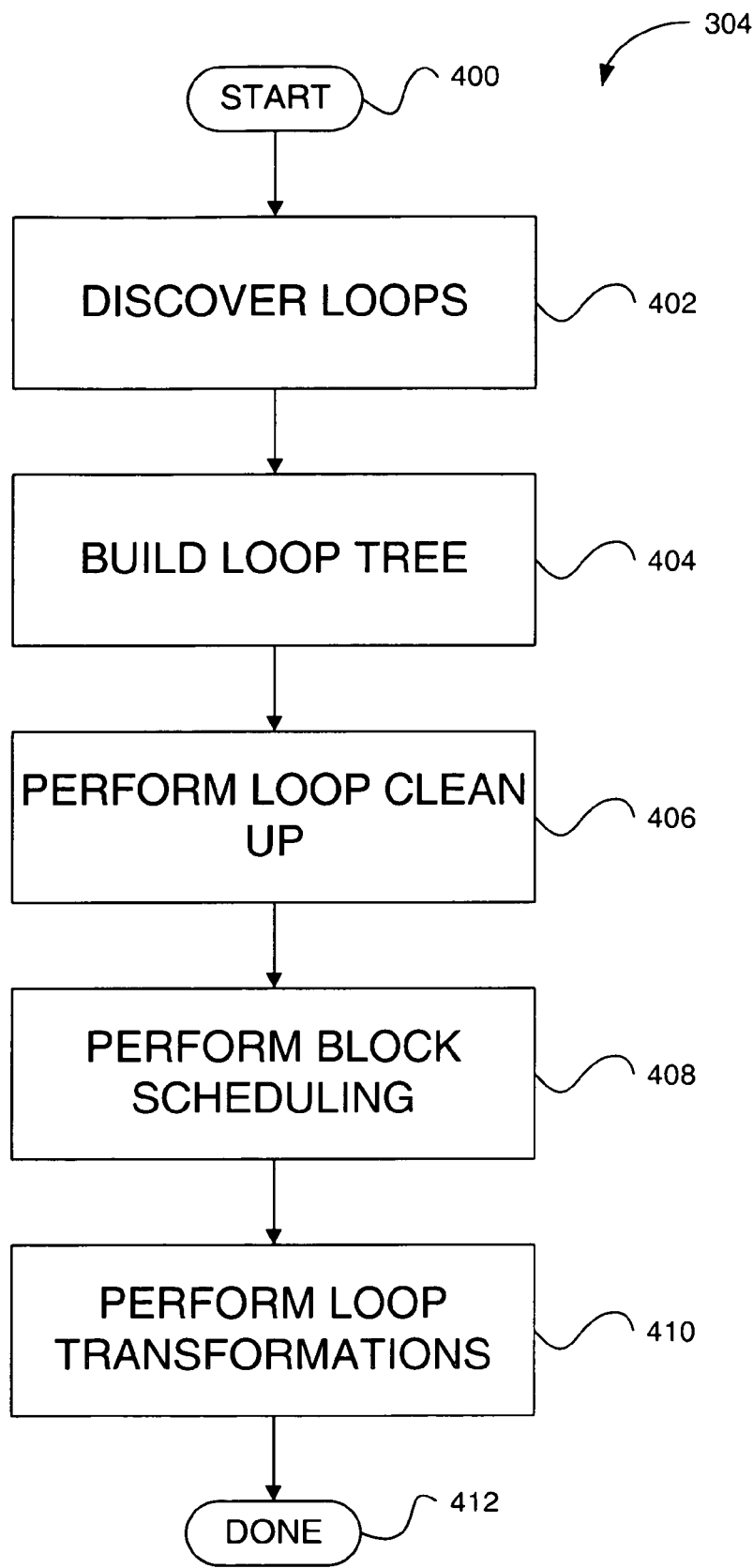
FIG. 4 is a flowchart showing a method for performing loop optimizations in accordance with an embodiment of the present invention.

FIG. 4 is a flowchart showing a method 304 for performing loop optimizations in accordance with an embodiment of the present invention. In an initial operation 400, preprocess operations are performed. Preprocess operations include byte-code parsing, global peep-hole analysis, and other preprocess operations that will be apparent to those skilled in the art.

In operation 402, loops existing in the IR for the compiler are discovered. In this operation, the loop structure of the Java program is discovered. Once the loops existing in the IR are discovered, a loop tree is built in operation 404. The loop tree represents the loops of the Java program by branching loops from a root node. The child nodes of a loop node represent nested loops, while loop nodes on the same level as a loop node represent parallel loops.

Figure 5A:
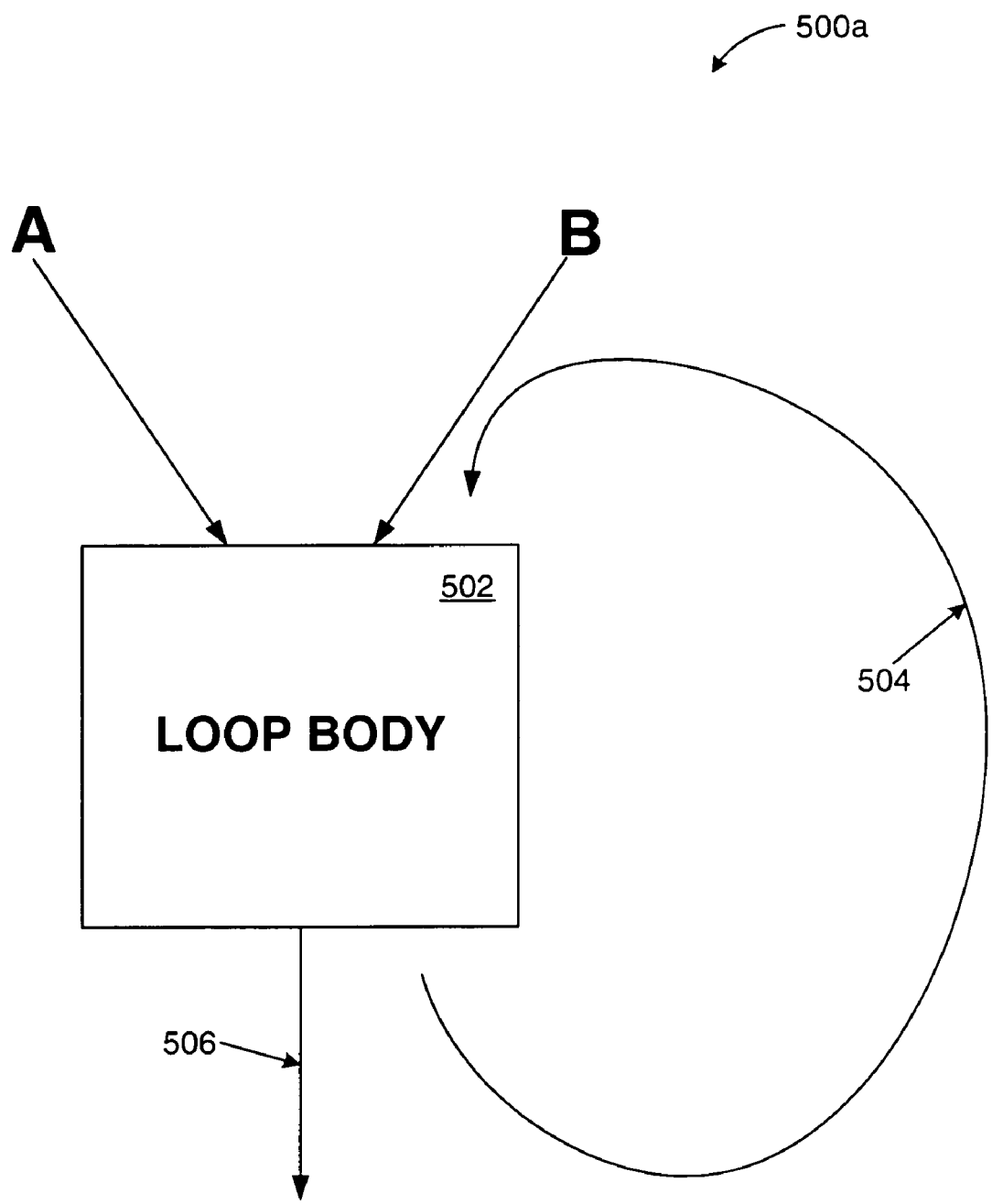
FIG. 5A is a control flow diagram showing a multiple fall-in loop structure.

In operation 406, loop clean up operations are performed. During this operation, inefficient loop structures such as multiple fall-in loop structures and partial invariant operations within nested loops are processed for increased efficiency. FIG. 5A is a control flow diagram showing a multiple fall-in loop structure 500*a*. The multiple fall-in loop structure 500*a* includes two entry paths A and B, a loop body 502, an iteration loop path 504, and a loop exit path 506.

The loop body 502 can include loop invariant operations that do not change as loop is executed. Generally, the efficiency of the loop structure 500a can be improved by moving the loop invariant operations outside the loop body 502. However, since there are two loop entry paths A and B, the loop invariant operations normally would be moved onto both the loop entry paths A and B. The embodiments of the present invention avoid copying the loop invariant operations to both loop entry paths by using a pre-header.

Figure 5B:
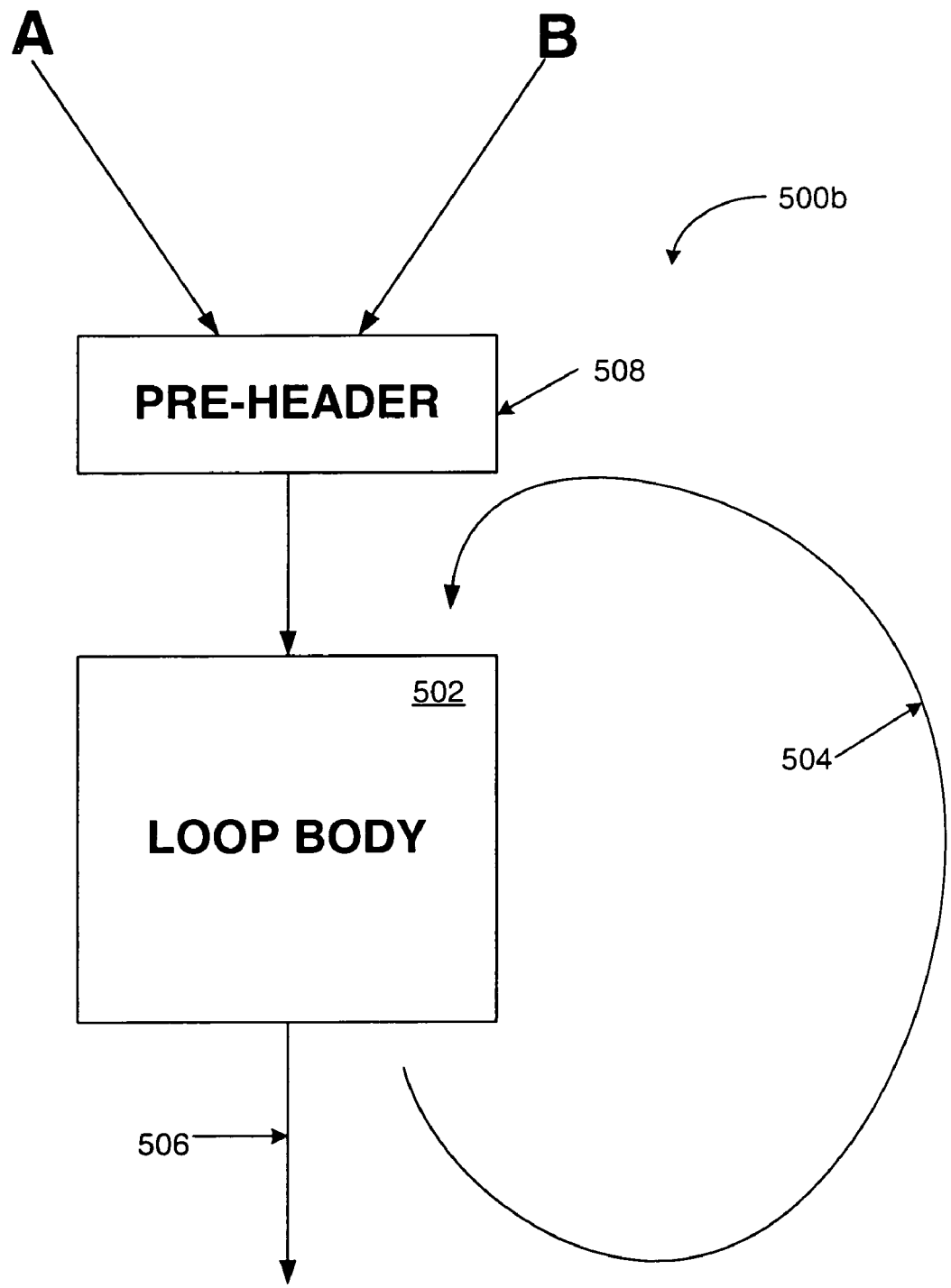
FIG. 5B is a control flow diagram showing a multiple fall-in loop structure having a pre-header, in accordance with an embodiment of the present invention.

FIG. 5B is a control flow diagram showing a multiple fall-in loop structure 500b having a pre-header, in accordance with an embodiment of the present invention. The multiple fall-in loop structure 500b includes two entry paths A and B, a loop body 502, an iteration loop path 504, a loop exit path 506, and a pre-header 508. The pre-header 508 includes the loop invariant operations that do not change within the loop body 502. In this manner, only one copy of the loop invariant operations is utilized and both loop entry paths A and B enter the loop body 502 via the pre-header 508.

Figure 6A:
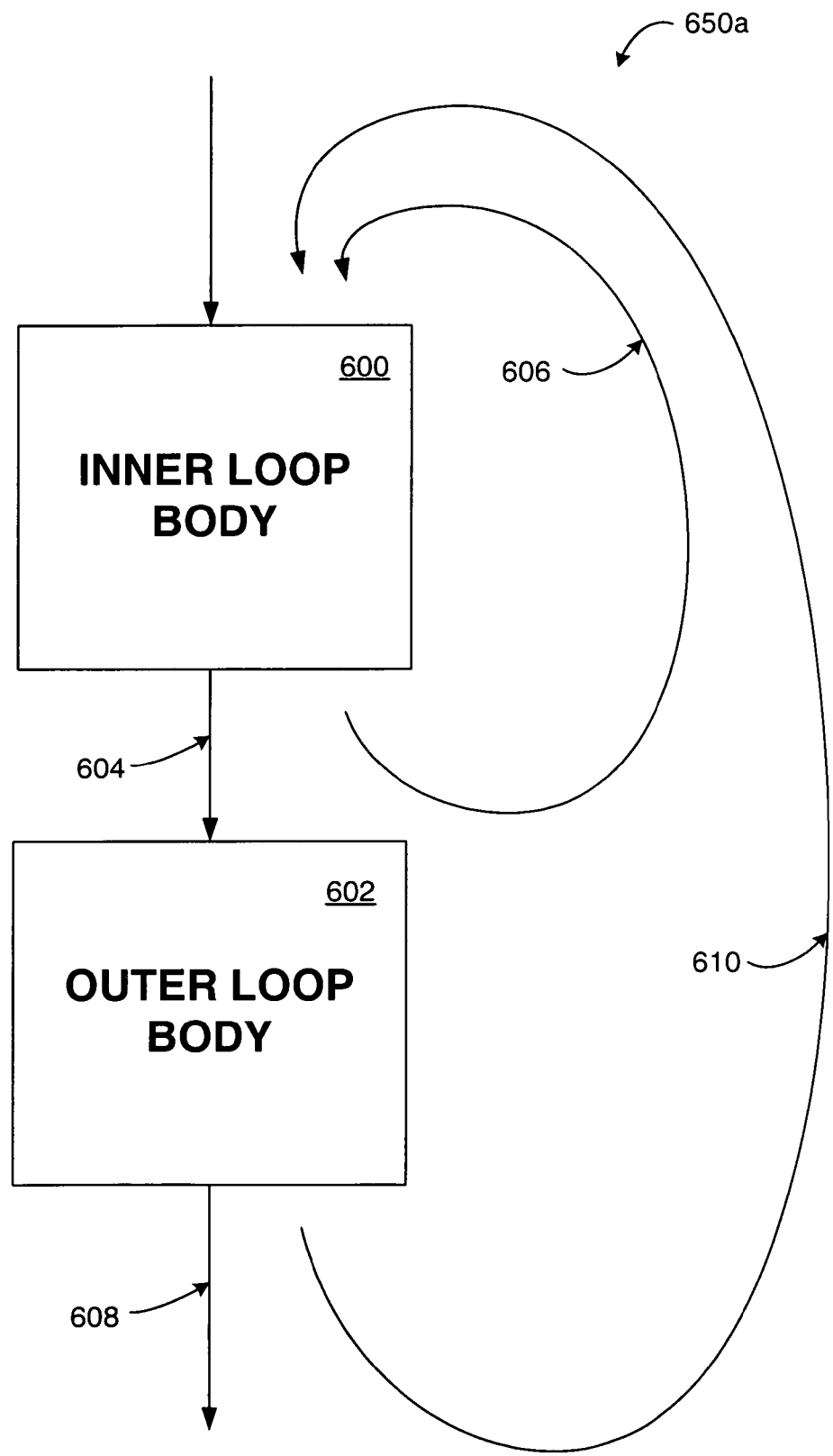
FIG. 6A is a control flow diagram showing a nested loop structure having invariant operations within an inner loop structure.

As mentioned above, inefficient loop structures such partial invariant operations within nested loops are also transformed in operation 406. FIG. 6A is a control flow diagram showing a nested loop structure 650a having invariant operations within the inner loop structure. The nested loop structure 650a includes an inner loop 600 having an iteration path 606 and a loop exit path 604. In addition, an outer loop 602 is included having an iteration loop path 610 and a loop exit path 608. The inner loop 600 includes partial loop invariant operations that do not change within the inner loop body 600, however, in this example, the partial loop invariant operations change within the outer loop body 602. Thus, the partial loop invariant operations generally cannot be taken outside the loop structure. As above, the embodiments of the present invention address this issue using a pre-header.

Figure 6B:
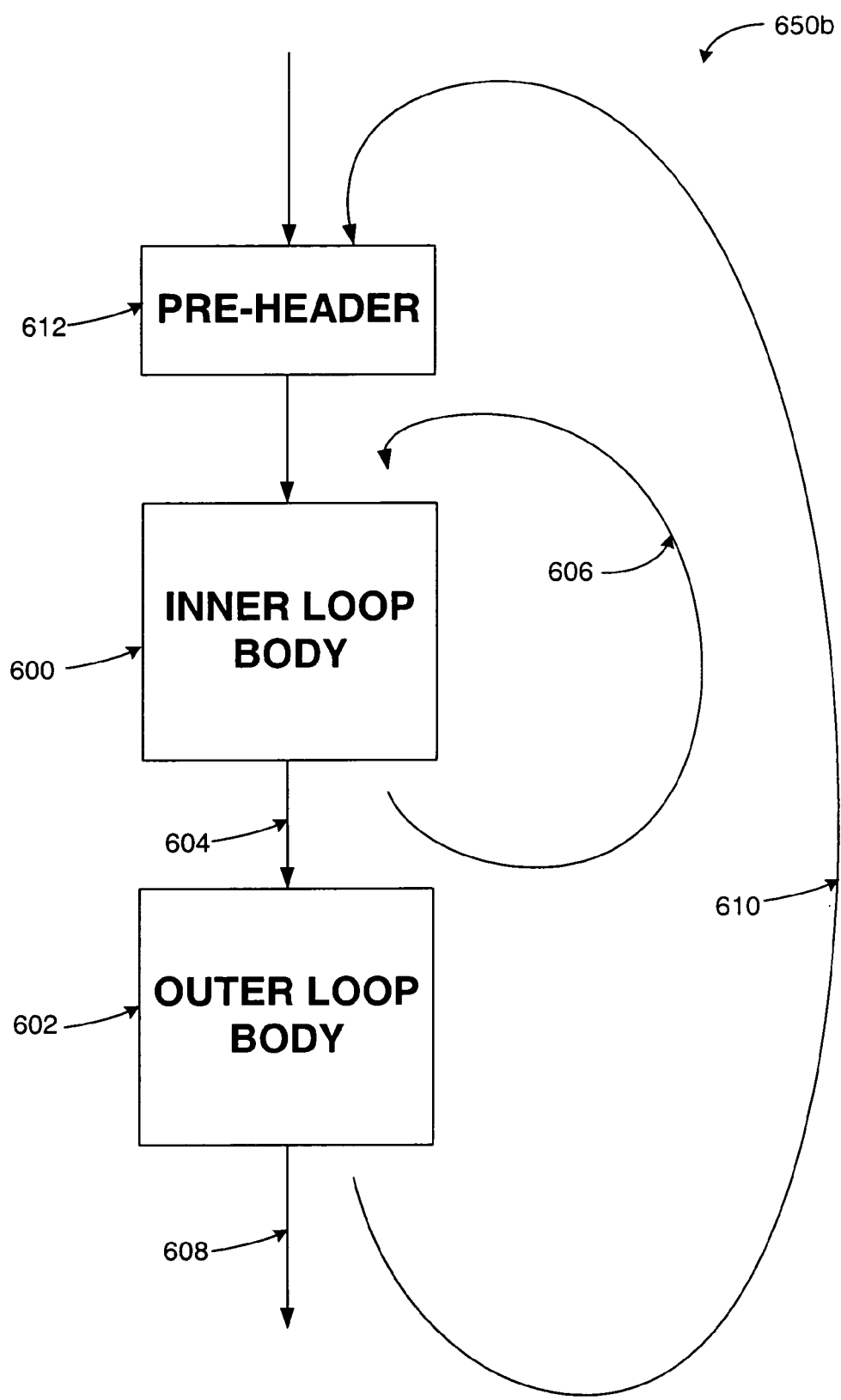
FIG. 6B is a control flow diagram showing a nested loop structure having a pre-header, in accordance with an embodiment of the present invention.

FIG. 6B is a control flow diagram showing a nested loop structure 650b having a pre-header, in accordance with an embodiment of the present invention. The nested loop structure 650b includes an inner loop 600 having an iteration path 606 and a loop exit path 604. In addition, an outer loop 602 is included having an iteration loop path 610 and a loop exit path 608. Further, a pre-header 612 is included that includes the partial invariant operations. The pre-header 612 can be entered from outside the nested loop structure and from the iteration path 610 of the outer loop body 602. In this manner, the partial invariant operations can still change via the outer loop path 610, while being moved outside the inner loop 600 to increase efficiency.

Referring back to FIG. 4, block scheduling is performed in operation 408. Block scheduling allows additional loop optimization to be performed that relies on the previous operations of the method 304. Loop transformations are then performed, in operation 410. Loop transformations are generally performed on counted loop structures. Counted loop structures are loops wherein the number of loop iterations can be determined prior to execution of the loop.

Loop transformations can include loop peeling, loop unrolling, and range check elimination (RCE). Loop peeling moves the first iteration of a loop structure outside the loop body to isolate test operations that can generally only fail on the first iteration of the loop. One example of a test operation that can generally only fail on the first iteration of a loop structure is a Null check, which is a test to determine if a pointer is a NULL pointer. Loop unrolling reduces the number of exit tests needed to execute a loop structure, and range check elimination moves range checks outside the main loop body. Post process operations are then performed in operation 412. Post process operations include code generation, and other post process operations that will be apparent to those skilled in the art.

RCE removes Java array range checks for the body of a loop. Java programs require range checks on array references. The embodiments of the present invention remove these range checks from the main body of loop structures via iteration splitting. Iteration splitting splits loop iterations into 'slow, checked' regions and 'fast, unchecked' regions.

Figure 7:
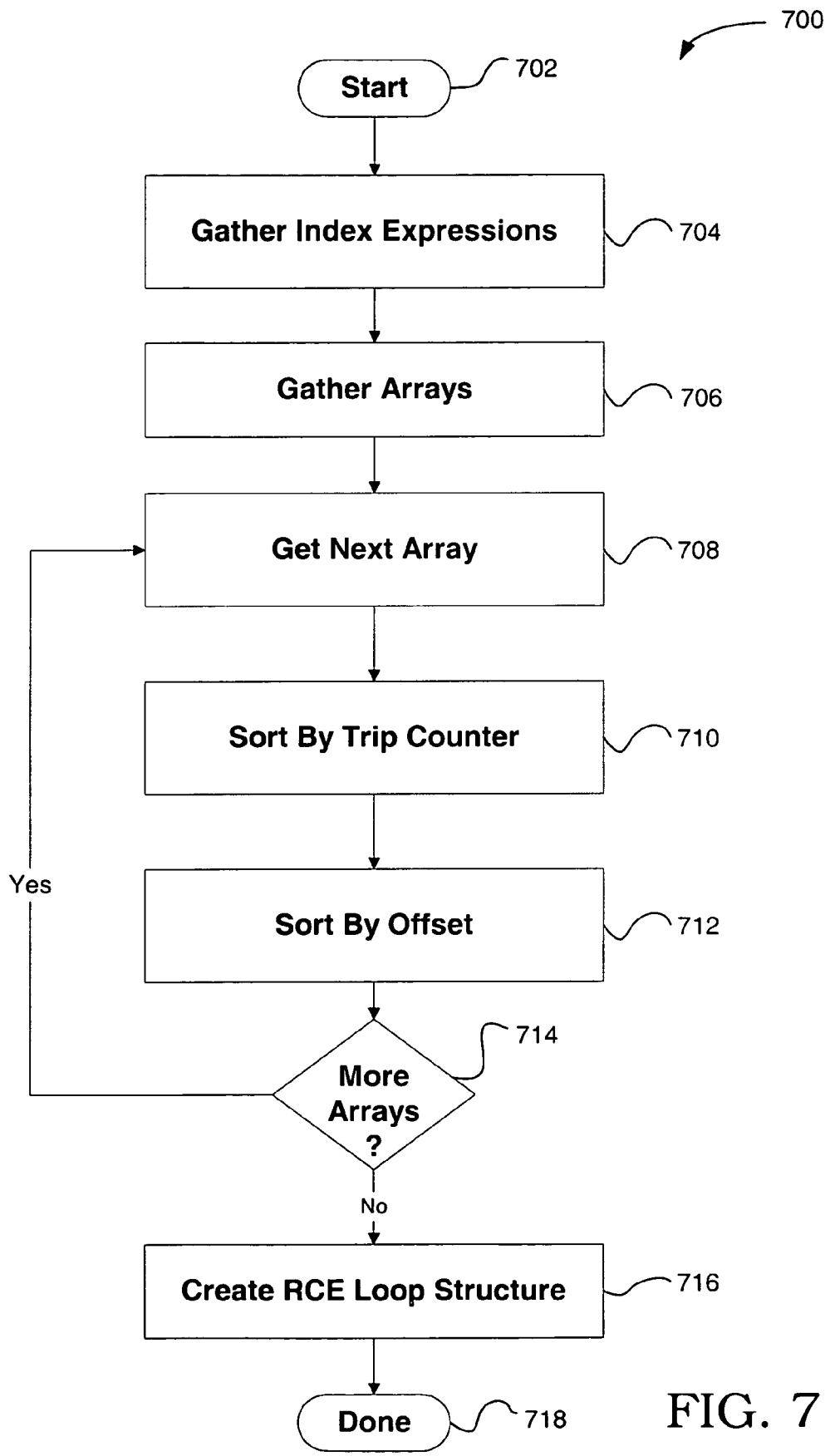
FIG. 7 is flowchart showing a method for range check elimination via iteration splitting, in accordance with an embodiment of the present invention.

FIG. 7 is flowchart showing a method 700 for range check elimination via iteration splitting, in accordance with an embodiment of the present invention. In an initial operation preprocess operations are performed. Preprocess operations include loop clean up, block scheduling, and other preprocess operations that will be apparent to those skilled in the art.

In operation 704, the compiler gathers together all index expressions. In this operation, the compiler discovers each array access operation occurring within the loop structure. These index expressions will be used to generate the RCE loop structure, as described in greater detail subsequently.

Next, all arrays are gathered in operation 706. The compiler determines which arrays are utilized in the discovered index expressions. In addition, the compiler determines the lengths of each of these arrays, for use in iteration splitting. In operation 708, the next array from the gathered arrays is examined. Each array is analyzed in light of the index expressions discovered in operation 704.

More specifically, in operation 710, the index expressions are sorted by the trip counters. A trip counter is the counter used in a counted loop to determine when to stop the loop iterations. These trip counters are particularly useful in array indexing within a loop structure to run though the entries of an array. Thus, in operation 710, the index expressions are sorted by the trip counter used in accessing the array, as shown in FIG. 8.

Figure 8:
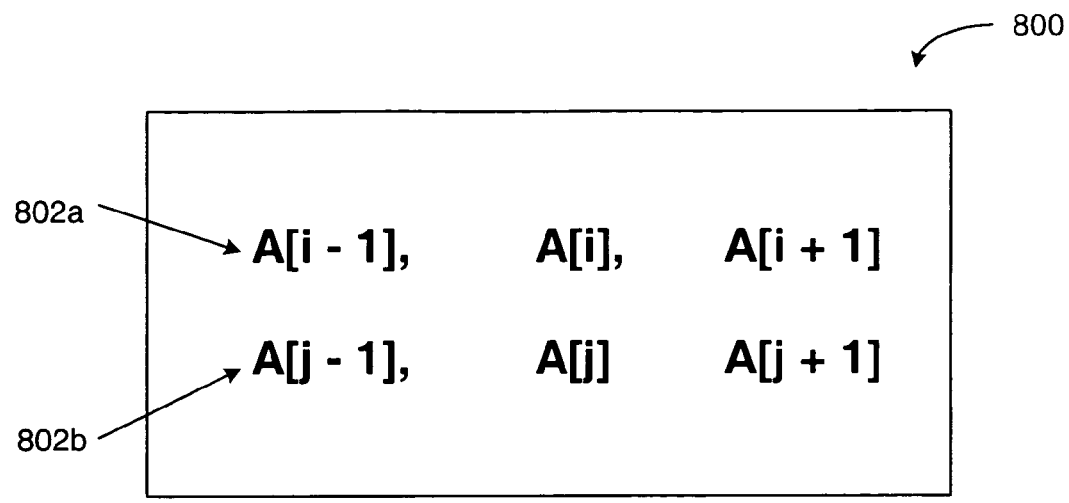
FIG. 8 is a diagram showing a plurality of exemplary sorted index expressions, in accordance with an embodiment of the present invention.

FIG. 8 is a diagram showing a plurality of exemplary sorted index expressions 800, in accordance with an embodiment of the present invention. The exemplary sorted index expressions 800 are sorted into sets 802a and 802b based on the trip counter used in the array index expression. Set 802a includes index expressions that index array A using trip counter i. Set 802b includes index expressions that index array A using trip counter j.

Referring back to FIG. 7, the index expressions are sorted by offset in operation 712. FIG. 8 shows the exemplary sorted index expressions 800 sorted by offset in addition to trip counter. The offset is the number added to the trip counter variable to index an array. Thus, index expressions are ordered by the offset used in the expression as well as being sorted by the trip counter.

A decision is then made in operation 714 as to whether more arrays are available. If additional arrays are present, the method 700 continues with another get array operation 708, in which the next array present is examined, as described above. Otherwise, the method 700 continues with a create RCE loop structure operation 716.

In operation 716, an RCE loop structure is created, based on the information obtained previously. As described in greater detail subsequently, the RCE loop structure uses iteration splitting for RCE. Broadly speaking, the RCE loop structure of the embodiments of the present invention splits the original loop structure into a pre-loop to handle underflow exceptions, a main loop for safe operation, and a post-loop to handle overflow exceptions. Post process operations are then performed in operation 718. Post process operations include code generation, scheduling, and other operations that will be apparent to those skilled in the art.

Figure 9:
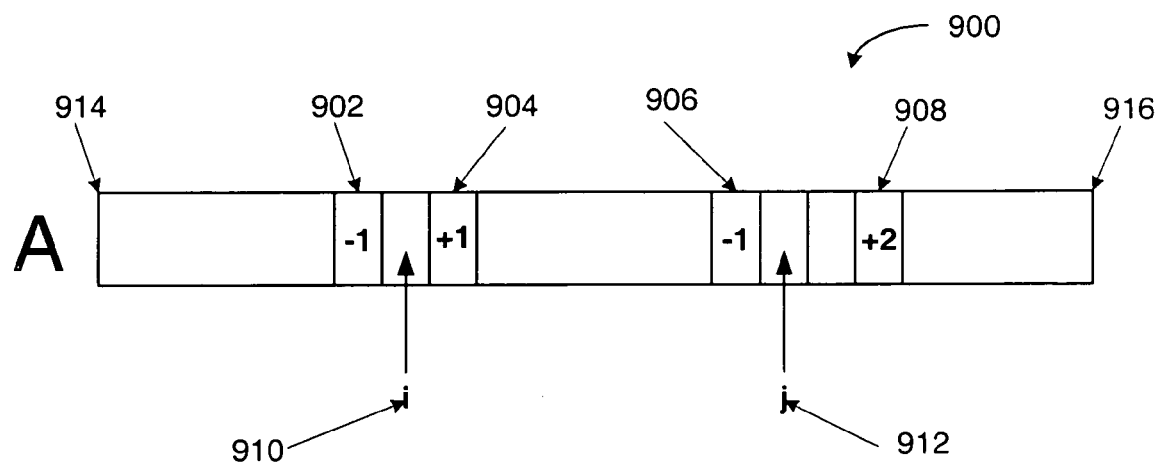
FIG. 9 is a block diagram showing an exemplary array structure A.

As will be seen, the RCE loop structure of the embodiments of the present invention removes range checks from the main loop structure of the RCE loop structure. FIG. 9 is a block diagram showing an exemplary array structure A 900. The exemplary array structure 900 is shown as being indexed by two trip counters, namely, trip counter i 910, and trip counter j 912. Referring back to FIG. 8, the lowest offset used with trip counter i is −1, and the highest offset used with trip counter i is +1. Similarly, the lowest offset used with trip counter j is −1, and the highest offset used with trip counter j is +2.

The array structure A 900 shown in FIG. 9 includes the lowest trip counter i offset 902, and the highest trip counter i offset 904. Similarly, the array structure A 900 includes the lowest trip counter j offset 906, and the highest trip counter j offset 908. As can be seen, the i trip counter will generate an underflow exception if the lowest offset 902 from i indexes before the beginning 914 of the array structure 900. In this example, the lowest offset 902 from i will index before the beginning 914 of the array structure A 900 if the array is indexed using the lowest offset 902 while i is equal to zero. Similarly, the i trip counter will generate an overflow exception if the highest offset 904 from i indexes beyond the end 916 of the array structure 900. In this example, the highest offset 904 from i will index beyond the end 916 of the array structure A 900 if the array is indexed using the highest offset 902 while i is equal to the length of array A 900. A similar situation occurs with respect to the j trip counter, however, the highest offset 908 from j will index beyond the end 916 of the array structure A 900 if the array is indexed using the highest offset 908 while j is equal to the length of array A 900 minus one.

Figure 10:
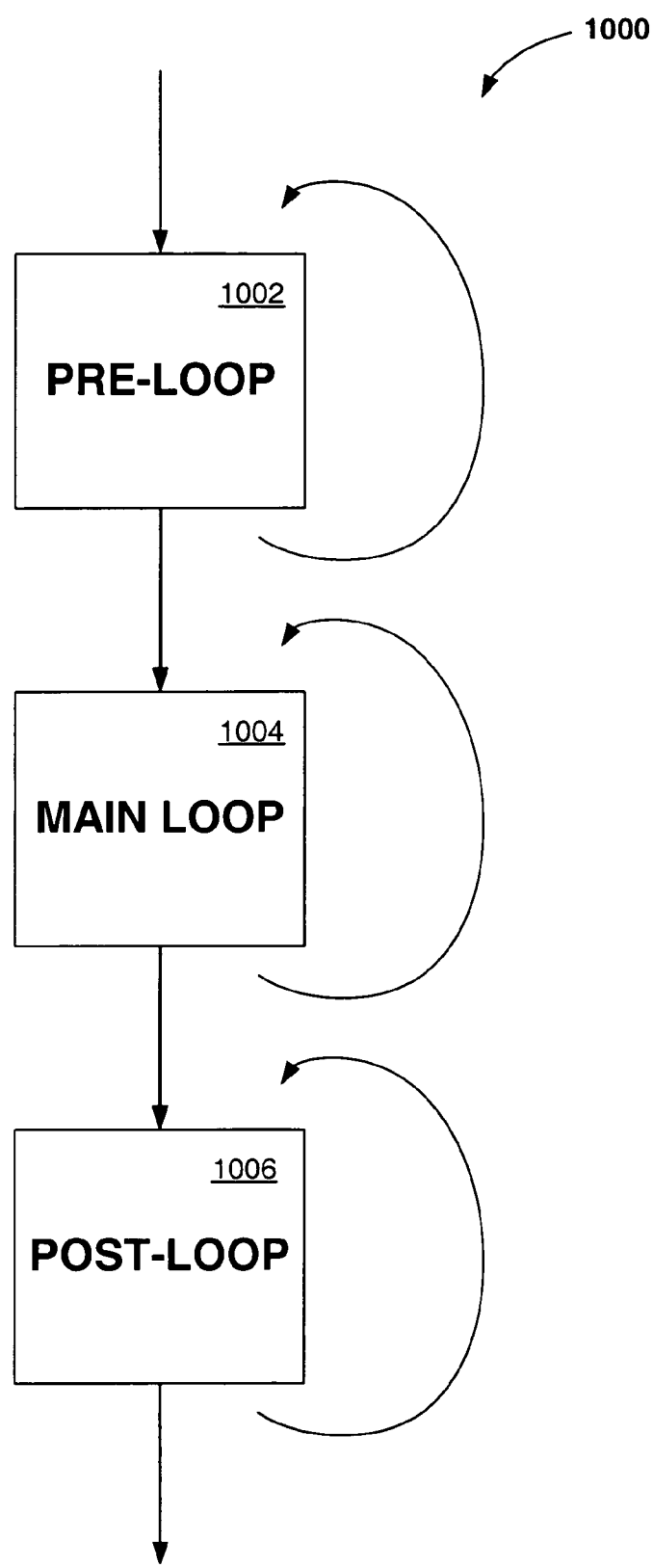
FIG. 10 is a control flow diagram showing a RCE loop structure, in accordance with an embodiment of the present invention.

The embodiments of the present invention utilize these observations to create a RCE loop structure. FIG. 10 is a control flow diagram showing a RCE loop structure 1000, in accordance with an embodiment of the present invention. As shown, the RCE loop structure 1000 splits the original loop structure into a pre-loop 1002, a main loop 1004, and a post loop 1006.

The pre-loop 1002 is used to handle indexing expressions capable of creating an underflow exception. Referring back to FIG. 9, the pre-loop 1002 can be utilized to handle loops wherein the trip counter and offset could cause an index before the beginning of the array. As can be seen, this can only occur in the example of FIG. 9 when i or j is equal to zero. Thus, the pre-loop 1002 can be used to handle loops wherein i and j are equal to zero. However, it should be noted that the pre-loop 1002 can be used for any loop iterations wherein an array access can result in an underflow exception.

The post-loop 1006 is used to handle indexing expressions capable of creating an overflow exception. Referring back to FIG. 9, the post-loop 1006 can be utilized to handle loops wherein the trip counter and offset could cause an index beyond the end of the array. As can be seen, this can only occur in the example of FIG. 9 when i is equal to the length of the array, or when j is equal to the length of the array minus one. Thus, the post-loop 1006 can be used to handle loops wherein i and j are equal to the array length, and when j is equal to the array length minus one. However, it should be noted that the post-loop 1006 can be used for any loop iterations wherein an array access can result in an overflow exception.

The main loop 1004 is used for all other iterations of the original loop structure. The main loop 1004 is used for array indexing expressions that cannot cause an underflow or an overflow. Since the underflow and overflow situations are handled by the pre-loop 1002 and the post-loop 1006 respectively, and all other situations are handled by the main loop 1004, the RCE loop structure 1000 functions as the original loop structure, and with greater efficiency.

More specifically, the pre-loop 1002 and the post-loop 1006 still include array boundary checks, since underflow and overflow can occur during these loops. However, the number of iterations the pre-loop 1002 and the post-loop 1006 execute is very few with respect to the main loop 1004. For example, if the array structure of FIG. 9 had 1000 entries and the loop ran from 0–999, then the pre-loop 1002 would execute one iteration, the post-loop 1006 would execute two iterations, while the main loop 1004 would execute about 997 iterations. Further, since the indexing expressions in the main loop 1004 will not generate underflows or overflows, the array boundary checking tests can be eliminated from within the main loop 1004. Hence, the number of array boundary checks occurring as a result of the RCE loop structure 1000 is greatly reduced.

Figure 11:
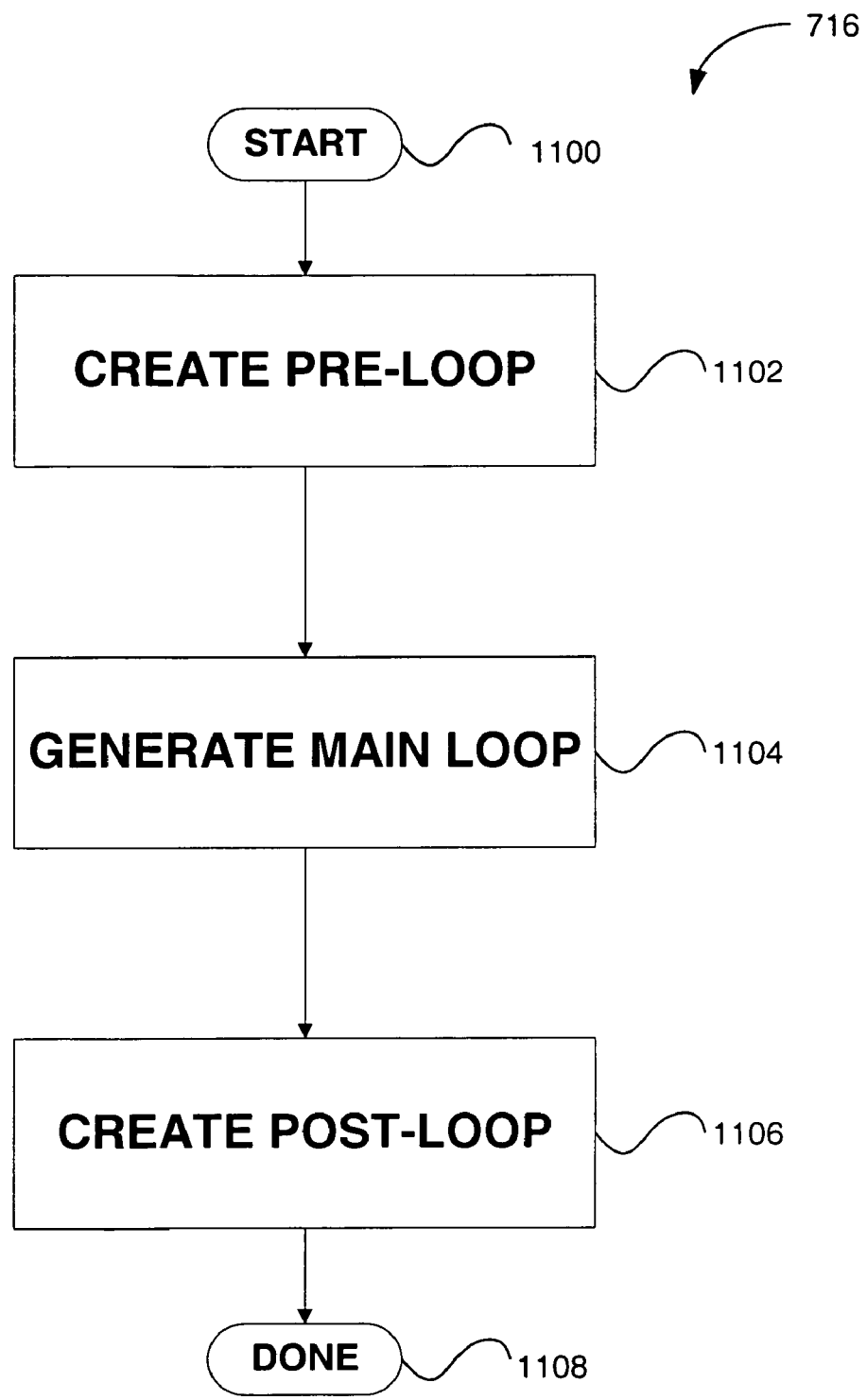
FIG. 11 is flowchart showing a method for creating a RCE loop structure, in accordance with an embodiment of the present invention.

FIG. 11 is flowchart showing a method 716 for creating a RCE loop structure, in accordance with an embodiment of the present invention. In an initial operation 1100, preprocess operations are performed. Preprocess operations include sorting the indexing expressions of the original loop, and other preprocess operations that will be apparent to those skilled in the art.

Figure 12:
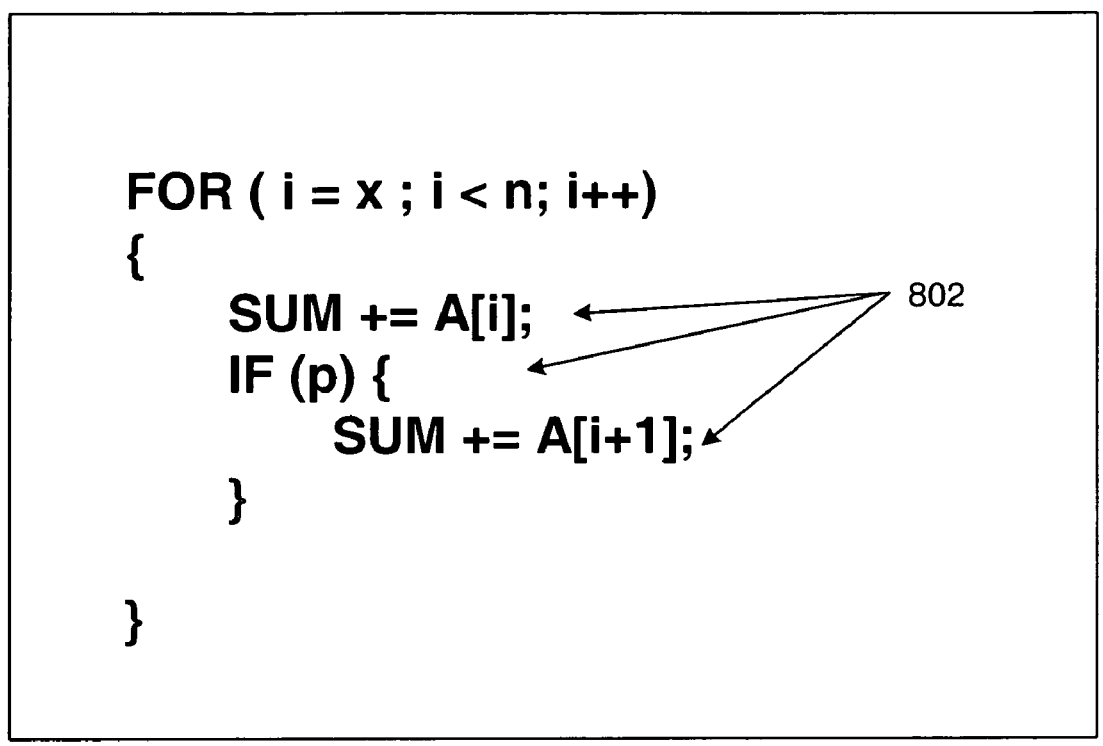
FIG. 12 is an illustration showing a pseudo-code segment for an exemplary loop structure.

In operation 1102, the pre-loop structure is created. As mentioned above, the pre-loop is used to handle situations wherein an underflow can occur as a result of indexing an array before the beginning of the array. For example, FIG. 12 is an illustration showing a pseudo-code segment for an exemplary loop structure 1200. As shown, the loop structure 1200 runs for trip counter i being equal to a value x, while the trip counter i is less than a value n, with i being incremented by one each iteration. Also, the loop body 802 sums the values of array A, adding the value of A at index i to the variable SUM during each iteration. In addition, during each iteration, if the value of variable p is TRUE, the value of A at index i+1 is added to the variable SUM during an iteration. The embodiments of the present invention process the loop 1200 into a pre-loop structure, main loop structure, and post-loop structure.

Figure 13:
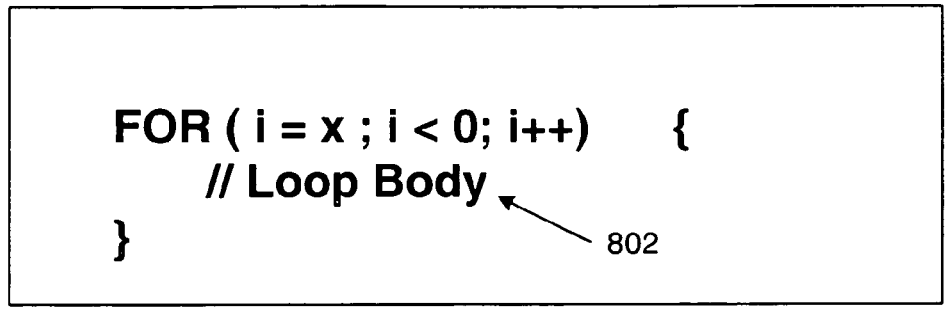
FIG. 13 is an illustration showing a pseudo-code segment for an exemplary pre-loop structure, in accordance with an embodiment of the present invention.

FIG. 13 is an illustration showing a pseudo-code segment for an exemplary pre-loop structure 1002, in accordance with an embodiment of the present invention. Based on the indexing expression present in the loop structure 1200, an underflow exception can only occur while i is less than zero. Thus, the pre-loop structure 1002 executes from i equal to x, while i is less than zero. In addition, array boundary checks are done in the loop body of the pre-loop structure 1002. Thus, depending on the value of x, the pre-loop 1002 may or may not generate an underflow exception.

Figure 14:
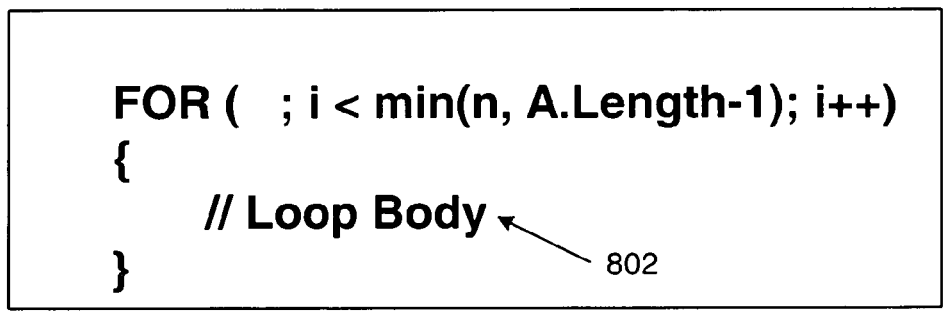
FIG. 14 is an illustration showing a pseudo-code segment for an exemplary main loop structure, in accordance with an embodiment of the present invention.

Referring back to FIG. 11, the main loop structure is generated in operation 1104. The main loop structure is a loop body in which underflow and overflow exceptions cannot occur. Thus, the main loop will only include iterations wherein the trip counters and offsets cannot generate underflow and overflow exceptions. FIG. 14 is an illustration showing a pseudo-code segment for an exemplary main loop structure 1004, in accordance with an embodiment of the present invention.

As shown, the main loop 1004 runs from the value of i at the end of the pre-loop 1002, while i is less than the minimum of either n or A length minus one, which ever is less. A length is the length of the array A. Since the pre-loop has handled any situation wherein in an underflow can occur, the main loop 1004 is designed to ensure an overflow will not occur. Based on the indexing expressions of the loop structure 1200, an overflow can only occur when i is equal to A length and p is TRUE. Hence, the main loop 1004 is designed to run until i is equal to A length minus one, or to n, if n is less than A length. In this manner, no overflow situation can occur in the main loop 1004.

Figure 15:
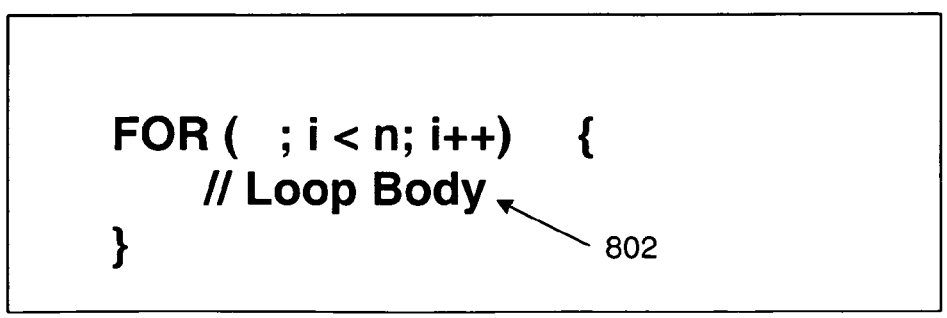
FIG. 15 is an illustration showing a pseudo-code segment for an exemplary post-loop structure, in accordance with an embodiment of the present invention.

Referring back to FIG. 11, the post-loop is created in operation 1106. As mentioned above, the post-loop is used to handle situations wherein an overflow can occur as a result of indexing an array beyond the end of the array. FIG. 15 is an illustration showing a pseudo-code segment for an exemplary post-loop structure 1006, in accordance with an embodiment of the present invention. Based on the indexing expression present in the loop structure 1200, an overflow exception can only occur while i is equal to A length and p is TRUE. Thus, the post-loop structure 1006 executes from i equal to its value at the end of the main loop 1004, while i is less than n. As can be seen, if n is equal to or greater than A length, an overflow can occur in the post-loop if the value of p is TRUE. In addition, array boundary checks are done in the loop body of the post-loop structure 1006.

Referring back to FIG. 11, post process operations are performed in operation 1108. Post process operations include code generation, scheduling, and other operations that will be apparent to those skilled in the art. Advantageously, the RCE loop structure of the embodiments of the present invention allows range check elimination optimization for complex loop structures in a dynamic compiling environment. Further, the embodiments of the present invention allow range check elimination in loop structures having conditional array access operations that may cause exceptions at the boundary of the array.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter, be read by a computer system. Examples of the computer readable medium include read-only memory, random-access memory, hard disks, removable cartridge media, CD-ROMs, magnetic tape, optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for loop optimization within a dynamic compiler system, comprising:
   discovering each index expression within a loop portion;
   determining which arrays are accessed using the index expressions;
   for each of the arrays accessed using the index expressions, sorting the index expressions by trip counter and offset portions of the index expressions; and
   creating a loop structure using iteration splitting wherein a plurality of loops are generated, each loop of the plurality of loops being based on an original loop structure of the loop portion, and wherein at least one of an upper or lower range check is eliminated in at least one loop of the loop structure, the loop structure being determined based on the sorted index expressions;
   wherein the creating a loop structure comprises creating a pre-loop structure based on the original loop structure of the loop portion, wherein the pre-loop structure is capable of testing indexing expressions for underflow; generating a main loop structure having indexing expressions based on the original loop structure, wherein the indexing expressions cannot produce an underflow, and wherein the indexing expressions cannot produce an overflow; and creating a post-loop structure based on the original loop structure, wherein the post-loop structure is capable of testing indexing expressions for overflow.

2. A method as recited in claim 1, wherein the pre-loop structure includes an array boundary test.

3. A method as recited in claim 2, wherein the post-loop structure includes an array boundary test.

4. A method as recited in claim 3, wherein the main loop structure does not include an array boundary test.

5. A method as recited in claim 1, further including the operation of compiling a computer program during execution of the computer program.

6. A method as recited in claim 5, further including the operation of interpreting lines of the computer program during execution of the computer program.

7. A method for range check elimination for a loop portion of a computer program, the method comprising:
   discovering each index expression within the loop portion;
   determining which arrays are accessed using the index expressions;
   for each of the arrays accessed using the index expressions, sorting the index expressions by the trip counter and offset; and
   creating a loop structure having a plurality of loops wherein iteration splitting is used to eliminate at least one of an upper or lower range check in at least one loop of the loop structure, the loop structure being determined based on the sorted index expressions.

8. The method of claim 7 wherein the program is a compiler's internal representation of bytecode.

9. The method of claim 8 further comprising transforming the computer program into native executable code.

10. The method of claim 7 wherein the loop structure comprises a pre-loop based on the loop portion wherein indexing expressions are boundary tested for underflow only, a main loop based on the loop portion wherein indexing expressions are not boundary tested, and a post-loop based on the loop portion wherein indexing expressions are boundary tested for overflow only.

11. A method for loop optimization in a computer program, the method comprising:

analyzing the program to discover loops; and for each of the loops, performing loop cleanup and loop transformations, wherein loop cleanup comprises moving loop invariant operations outside the loop body and wherein loop transformations comprises:

discovering each index expression within the loop;

determining which arrays are accessed using the index expressions discovered by the discovering;

for each of the arrays accessed using the index expressions, sorting the index expressions by trip counter and offset portions of the index expressions; and creating a loop structure wherein iteration splitting is used to eliminate at least one of an upper or lower range check in at least one loop of the loop structure, based on the sorted index expressions.

12. The method of claim 11 wherein the program is a compiler's internal representation of bytecode.

13. The method of claim 12 further comprising transforming the computer program into native executable code.

14. The method of claim 11 wherein the loop structure comprises a pre-loop based on the loop portion wherein indexing expressions are boundary tested for underflow only, a main loop based on the loop portion wherein indexing expressions are not boundary tested, and a post-loop based on the loop portion wherein indexing expressions are boundary tested for overflow only.

15. A method for executing a bytecode program, the method comprising:

optimizing a loop structure of the subroutine by performing loop transformations, the optimizing comprising discovering each index expression within the loop, determining which arrays are accessed using the index expressions, for each of the arrays accessed using the index expressions, sorting the index expressions by trip counter and offset, and creating a loop structure wherein iteration splitting is used to eliminate at least one of an upper or lower range check in at least one loop of the loop structure, the loop structure being determined based on the sorted index expressions.

16. The method of claim 15 further comprising:

receiving a bytecode in an interpreter;

determining whether native code corresponding to the bytecode is available;

when the native code is not available, incrementing a bytecode counter;

interpreting the bytecode when the bytecode counter is below a threshold;

compiling a subroutine containing the bytecode into native code when the bytecode counter is above the threshold, the compiling comprising the optimizing; and executing the native code after the compiling or when the native code is determined to be available.

17. The method of claim 16 wherein the compiling further comprises generating an internal representation of the subroutine prior to the optimizing.

18. The method of claim 15 wherein the loop structure comprises a pre-loop based on the loop portion wherein indexing expressions are boundary tested for underflow only, a main loop based on the loop portion wherein indexing expressions are not boundary tested, and a post-loop based on the loop portion wherein indexing expressions are boundary tested for overflow only.

* * * * *